United States Patent [19]
Waite

[11] 3,933,313
[45] Jan. 20, 1976

[54] SPRAY TUBING WITHIN A ROTATING DRUM SUPPORTED INDEPENDENTLY OF THE DRUM

[75] Inventor: John J. Waite, Chateauguay, Canada

[73] Assignee: Allis-Chalmers Corporation, Milwaukee, Wis.

[22] Filed: Nov. 13, 1974

[21] Appl. No.: 523,526

[52] U.S. Cl. ............................. 239/587; 239/567
[51] Int. Cl.² ..................... B05B 15/08; B05B 1/18
[58] Field of Search .......... 239/542, 587, 567, 276, 239/132.3; 248/85

[56]          References Cited
          UNITED STATES PATENTS

| | | | |
|---|---|---|---|
| 532,281 | 1/1895 | Melavin | 239/276 |
| 1,259,211 | 3/1918 | Coles | 239/110 |
| 3,030,031 | 4/1962 | Barker | 239/276 |
| 3,612,408 | 10/1971 | Holleman | 239/587 |
| 3,625,427 | 12/1971 | Nadkarni et al. | 239/132.3 |
| 3,817,454 | 6/1974 | Pira | 239/542 |

*Primary Examiner*—Lloyd L. King
*Attorney, Agent, or Firm*—Robert C. Jones

[57]          ABSTRACT

A detachable mounting and support arrangement for the stationary spray tube which extends through a rotary drum. A tension cable extends through the spray tube and is anchored exteriorly of the drum and spray tube at each end of the drum.

6 Claims, 2 Drawing Figures

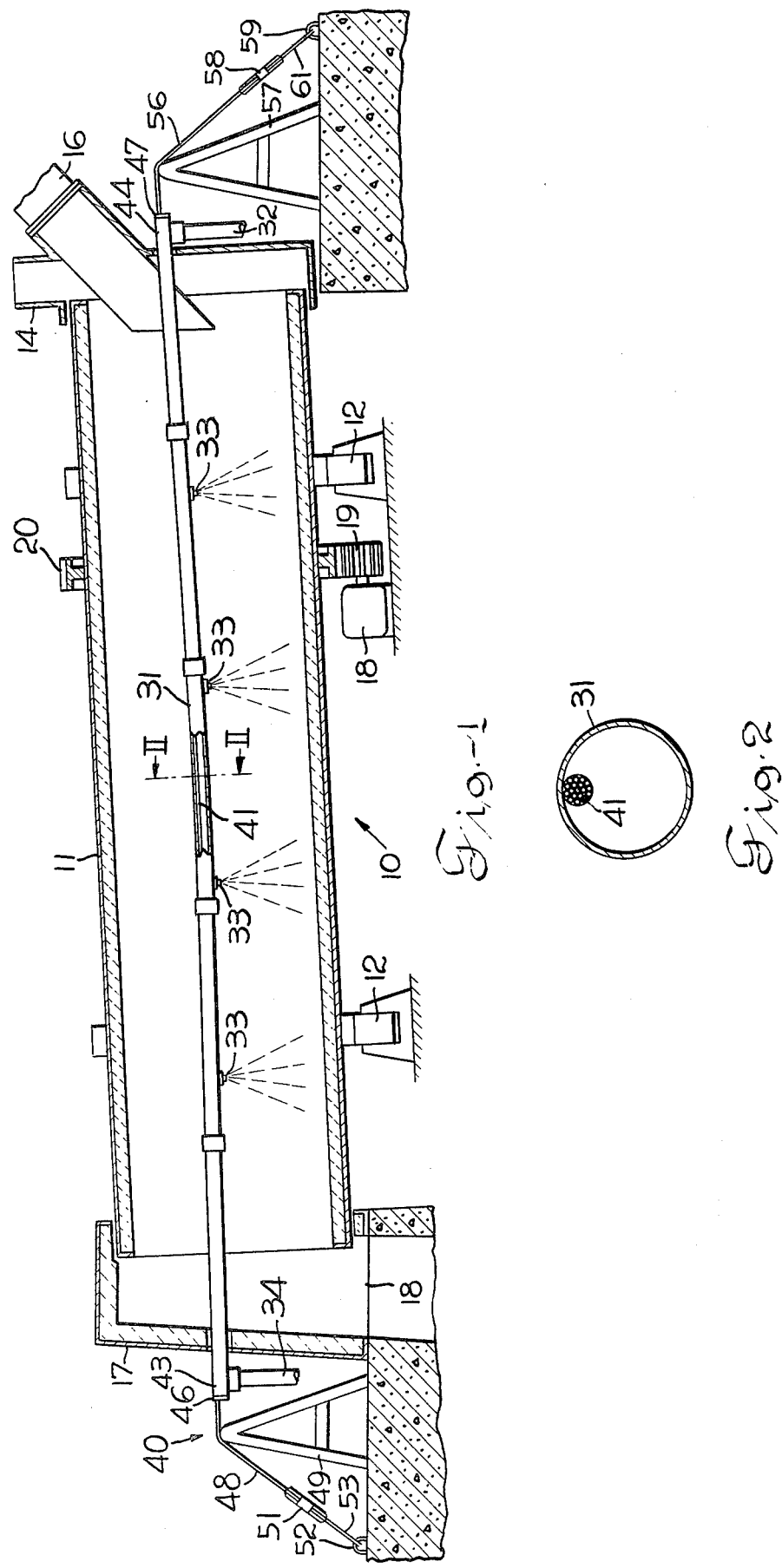

SPRAY TUBING WITHIN A ROTATING DRUM SUPPORTED INDEPENDENTLY OF THE DRUM

BACKGROUND OF THE INVENTION

This invention relates generally to rotary drums or coolers, and in particular to the spray tubing therein which conveys cooling water to the interior of the rotating drum. In the prior art, spray tubes are known but these tubes have been supported so as to rotate with the drum. In extremely long coolers or drums, 100 feet or more, the weight of the tube makes it mechanically impossible to support the tube in a rotary cooler. This is particularly true when, in addition to the length of the cooler, temperatures of the product within the cooler are initially at 2500°F. Thus, the combination of the factors of length, weight and temperature combine to defeat the usual supporting arrangement for cooling tubes. Known arrangements for supporting spray tubes, such as rotating spider supports with central water cooled and lubricated bearings, present problems that affect product flow through the cooler, contamination of the product as it moves through the cooler and access for servicing. The steel frame or truss support is entirely too large and is also sensitive to the extremely high temperature of the material within the cooler and would require its own cooling system.

These known supporting arrangements offer no suggestions to solving the particular problem, and it is to solving this problem that the invention is directed and a solution provided.

SUMMARY OF THE PRESENT INVENTION

According to a preferred embodiment of the present invention, a rotary cooler having a long cylindrical shell mounted to rotate about its central axis is provided. Extending longitudinally through the cylindrical cooler shell is a spray pipe or tube which is supported independently of the cylindrical shell. A cable extends through the spray pipe or tube and is anchored at each end beyond the ends of the cylindrical cooler shell. The cable is under tension and supports the spray pipe in substantial parallelism with the axis of the cylindrical cooler shell. Thus, the cable supports the weight of the spray pipe and the cooling fluid flowing through the pipe without interfering with the normal operation of the rotary cooler.

DESCRIPTION OF THE DRAWINGS

FIG. 1 is a side elevation partly in section of a rotary cooler incorporating the present invention; and, FIG. 2 is a view taken along the line II—II in FIG. 1.

DESCRIPTION OF THE PREFERRED EMBODIMENT

According to the preferred embodiment of the present invention, a rotary cooler 10 comprising a cylindrical shell is mounted on rollers 12 for rotation of the cylindrical shell about its own axis. The shell 11 has a material inlet end provided with a feed hood 14 having a supply chute 16 projecting therethrough and into the rotatable cylindrical shell 11. The cooler 10, at its opposite end, is provided with a material outlet including a discharge hood 17 having a material outlet 18 for cooled material and the fluid coolant. Power for rotating the cylindrical cooler shell 11 is obtained from a motor 18, the drive shaft of which is provided with a gear 19 adapted to mesh with a bull gear 20 affixed to the shell 11.

The cooler shell 11 receives a spray pipe 31 which extends through the entire length of the cooler shell 11 and outwardly beyond the inlet and outlet hoods 14 and 17. The spray pipe 31 can be assembled in convenient lengths and jointed to facilitate the insertion of the spray pipe into the shell 11. The assembled spray pipe 31 extends outwardly of the feed hood 14 and the discharge hood 17. At the feed end of the cooler, the spray pipe 31 is provided with a fluid inlet pipe 32 which provides a sufficient volume of fluid to the spray pipe 31 to maintain the desired discharge pressure through the plurality of spray nozzles 33, only four being depicted. The volume of fluid provided to the spray pipe 31 is also sufficient to maintain the pipe 31 in substantially full capacity at all times. At the discharge end of the cooler 11, the spray pipe 31 is provided with an outlet 34.

To provide the extremely long spray pipe 31 within the cooler 10 and not encumber the cylindrical shell 11 with interfering structure, a novel support arrangement has been provided. To this end, a cable suspension means 40 is provided. As shown in simplified format, a stranded cable 41 is inserted through the spray pipe 31 and extends outward of both of the external ends 43 and 44 of the spray pipe 31. The external ends 43 and 44 of the spray pipe 31 through which the cable 31 extends are sealed by means of a stuffing box 46 and 47 or other suitable means, such as a seal incorporating a clamping device. In any event, the seals 46 and 47 effectively prevent fluid in the spray pipe 31 from leaking or escaping from the pipe. This arrangement maintains the desired pressure within the pipe so that the spray nozzles 33 cover their designated areas. The end 48 of the cable 31 is entrained over an upright support 49 and secured to one end of a tensioner 51. The opposite end of the tensioner 51 is secured to an anchor 52 by means of a relatively short length of cable 53. It will be appreciated that the tensioner 51 can be secured directly to the anchor 52. A similar arrangement is provided for the opposite end of the cable wherein the extending end 56 is entrained over a support 57 and secured to a tensioner 58. The opposite end of the tensioner 58 is secured to an anchor 59 by means of a relatively short strand of cable 61.

With the arrangement described, the spray piping or tubing 31 can be assembled in convenient lengths and jointed. The cable 41 and pipe 31 will assume a natural sag which will be stable and can be compensated for when positioning the nozzles 33. The cable 41 within the spray pipe 31 is immersed in the fluid coolant and is not subject to heat distress. With the arrangement, the cable 41 is also protected from erosion by steam or abrasives and can be further protected from water corrosion, if necessary, by a suitable coating.

From the foregoing description of the present invention, it has been shown how the objects of the preferred arrangement of the invention have been attained. However, modifications of the concept disclosed which may occur to those skilled in the art, now that the invention has been disclosed, are intended to be included within the scope of the invention.

The embodiments of the invention in which an exclusive property or privilege is claimed are defined as follows:

1. In a rotary cooler device having an elongated cylindrical shell;

a tubular spray pipe extending through the elongated cylindrical shell but having no physical connection to the cylindrical shell;

a support within said tubular spray pipe and extending outwardly of the ends thereof;

anchor means at each end of the cooler device external of the cylindrical shell; and, means connecting the extending ends of said support to said anchor means.

2. A rotary cooler device according to claim 1 wherein there is provided a means for applying a tensioning force to at least one end of said support.

3. A rotary cooler device according to claim 2 wherein there is provided a support means at each end of the cooler device operable to maintain said spray pipe support in a plane which is substantially parallel to the axis about which said cylindrical shell is rotatable.

4. A rotary cooler device according to claim 3 wherein said spray pipe support is a cable, the ends thereof extending outwardly of said spray pipe and beyond the ends of said cylindrical shell; and, said support means at each end of the cooler device is constructed and arranged to engage said extending ends of said cable externally of the cooler device in a manner to position and maintain said cable in substantial parallelism with the axis about which the cylindrical shell is rotatable.

5. A rotary cooler device according to claim 4 wherein said cable and said spray pipe is provided with a plurality of spaced apart spray nozzles arranged to direct fluid from the spray pipe over a predetermined internal area of said cylindrical shell; and, said spray pipe and cable assume a natural sag which will be stable and said nozzles are positioned along the spray pipe with consideration being taken of the natural sag of the spray pipe and cable.

6. A rotary cooler device according to claim 5 wherein said spray pipe comprises a plurality of jointed sections; and, sealing means in the ends of said spray pipe through which said cable extends to prevent leakage of the fluid within said spray pipe therefrom.

* * * * *